United States Patent [19]
Brough

[11] Patent Number: 5,206,993
[45] Date of Patent: May 4, 1993

[54] METHOD OF ASSEMBLING TWO ROW ANGULAR CONTACT BEARING WITH IMPROVED AXIAL END PLAY

[75] Inventor: Raymond B. Brough, Port Clinton, Ohio

[73] Assignee: General Motors Corporation, Detroit, Mich.

[21] Appl. No.: 888,084

[22] Filed: May 26, 1992

[51] Int. Cl.$^5$ .............................................. F16C 43/00
[52] U.S. Cl. .................................. 29/898.062; 29/407; 29/898.09; 384/450
[58] Field of Search ....................... 29/898.06, 898.061, 29/898.062, 724, 899, 407, 898.09; 384/450, 491, 512, 516

[56] References Cited

U.S. PATENT DOCUMENTS

| | | | |
|---|---|---|---|
| 2,796,658 | 6/1957 | Aller | 29/898.062 |
| 3,079,678 | 3/1963 | Aller et al. | 29/705 |
| 4,635,330 | 1/1987 | Fritz | 29/898.062 |

FOREIGN PATENT DOCUMENTS

| | | | |
|---|---|---|---|
| 272391 | 10/1989 | German Democratic Rep. | 384/491 |
| 842266 | 6/1981 | U.S.S.R. | 384/512 |

*Primary Examiner*—Mark Rosenbaum
*Assistant Examiner*—S. Thomas Hughes
*Attorney, Agent, or Firm*—Patrick M. Griffin

[57] ABSTRACT

A novel method for assembling a two row, angular contact bearing achieves improved axial end play without providing more ball diameter classes. The actual width of the pairs of opposed ball pathways is gauged. When and if the width falls nearly halfway between two available ball diameter classes, one row is chosen from the larger class above, and the other from the smaller class below, the midpoint. The net effect is improved axial end play with no appreciable effect on contact angle or bearing operation.

1 Claim, 1 Drawing Sheet

METHOD OF ASSEMBLING TWO ROW ANGULAR CONTACT BEARING WITH IMPROVED AXIAL END PLAY

This invention relates to angular contact ball bearings in general, and in particular to an improved method for assembling such bearings that gives improved axial end play.

BACKGROUND OF THE INVENTION

Two row angular contact bearings have a pair of coaxial races with two pairs of diagonally opposed ball pathways between which two rows of bearing balls run. By diagonally opposed, it is meant that the pathways of each pair are both axially and radially separated, and cover less than 90 degrees, contacting the ball row at opposed quadrants, in effect. This, as opposed to so called full arch ball pathways, in which the pathways cover more than 90 degrees, and are separated only in the axial or radial directions. The thin annular sections along which the balls actually contact the pathways form what is termed a contact angle with one another, and the contact angles of the two pairs of pathways may converge or diverge externally of the bearing. Because of their load supporting and assembly characteristics, such bearings are particularly suitable for vehicle wheel bearings, and an example of such may be found in U.S. Pat. No. 4,179,167 to Lura et al, assigned to the assignee of the current invention.

When assembling the bearing, and particularly when choosing the balls for each ball row, careful account must be taken of manufacturing tolerances. Neither the pathways nor the balls can be ground to exacting, perfect specification in every case, so one must be chosen to match the other. For example, ball pathways that are slightly widely spaced can be filled with balls that are slightly over specification in diameter, or vice versa, and the bearing will operate acceptably. One of the critical parameters that depends on how carefully the balls are matched to the pathways is axial end play, a measure of how far the races will move axially relatively to one another as they run. Closer matching of ball diameter to pathway width reduces end play.

Conventionally, the matching process consists of picking a pair of inner and outer races, referred to as the spindle and hub respectively, and holding them in a gauging jig that aligns them until the two opposed pairs of ball pathways are equally spaced apart. Then, the width of the two pairs of pathways is gauged. The available supply of bearing balls is divided up into a series of discrete classes, one of which has a diameter that is substantially equal to the ideal ball diameter, and the rest of which are larger or smaller than the ideal diameter by an integer multiple of a predetermined increment. In fact the bearing balls in within each class differ in size slightly, due to tolerances, but are arrayed in a normal distribution about the class size. How many classes of balls there are depends on how small the predetermined increment is. That is, an increment half as large will require twice as many ball classes.

Once the ball pathway width is measured, to whatever accuracy the gauge allows, balls are chosen from the class that most closely matches the gauged width. However, since the classes of balls are discrete, not continuous, they do not cover every possible gauged width, and cannot always match that width. The match will be farthest off when the gauged width falls midway between two available ball classes. Conventionally, the ball diameter chosen will be either that from the "too large" class above, or the "too small" class below the midpoint. The first choice has low end play, but the balls are tight between the pathways, which can cause a high preload. The second choice has a lower preload, but higher end play. The obvious way to improve the situation is to halve the increment, and double the number of ball classes. This is more expensive in terms of time and inventory, however.

SUMMARY OF THE INVENTION

The invention provides a simple, novel method by which the ball-pathway match and resultant end play can be improved, but without the necessity of providing more ball classes.

The ball pathway width is gauged as it is normally. In the event that the gauged width should fall close to a midpoint between two available ball classes, one row is chosen from the class above the midpoint, and the other from the class below. It has been found that the differing size of the two ball rows can be accommodated in the angular contact bearing, because each row can seek a slightly different "equilibrium" position between the diagonally opposed pathways, which would not be possible with full arch pathways. This contravenes accepted thinking on ball-pathway matching, because neither row is "correctly" sized, and, more importantly, the two rows are not equal in diameter. However, it has been found that the net effect of this deliberate mismatch is to actually improve end play, achieving values around 80% of what could be achieved by providing twice as many ball classes.

It is, therefore, a general object of the invention to provides a novel method of assembling a two row, angular contact bearing that improves axial end play.

It is another object of the invention that does not require providing more available classes of bearing balls.

It is another object of the invention to provide a method that only requires a new way of choosing balls from the available classes of balls.

It is still another object of the invention to provide such a method in which, when the gauged pathway width falls near a midpoint between two available ball diameter classes, one row is chosen from the class above and one from the class below.

DESCRIPTION OF THE PREFERRED EMBODIMENT

These and other objects and features of the invention will appear from the following written description, and from the drawings, in which.

Figure 1:
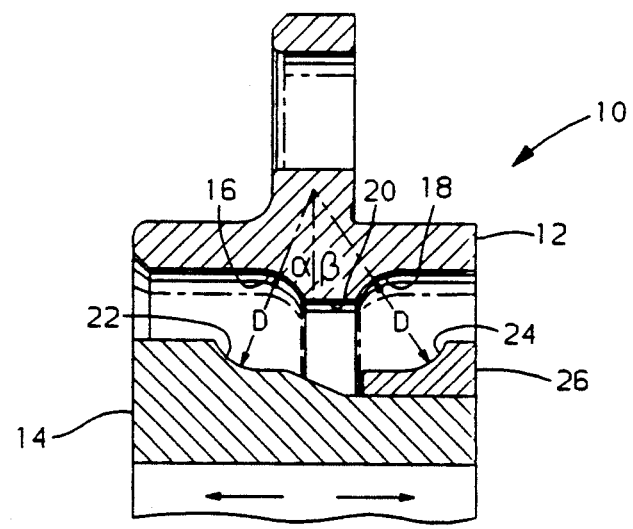
FIG. 1 is a cross section through one side of the hub and spindle of a two row, angular contact wheel bearing illustrating the ideal ball pathway width and contact angles.

Referring first to FIG. 1, a conventional two row, angular contact wheel bearing is indicated generally at (10). Bearing (10) has two coaxial races, an outer hub (12) and an inner spindle (14). Ground into hub (12) are a pair of left and right outer pathways (16) and (18), which are arrayed on northeast and northwest quadrants respectively. Neither pathway (16) or (18) covers more than 90 degrees, so each merges into a smooth, unobstructed cylindrical surface to either side, with a shoulder (20) between. Spindle (14) carries two pathways diagonally opposed to (16) and (18), indicated at (22) and (24) respectively. By diagonally opposed, it is meant that the two respective pairs of pathways, (16-22) and (18-24) are both radially and axially spaced from one another, arrayed on opposite quadrants. That is, left spindle pathway (22) lies on a southwest quadrants, and right spindle pathway (24) on a southeast quadrant. Right spindle pathway (24) is not integrally ground to spindle (14), but is, instead, ground to a separable race ring (26). This allows the bearing (10) to be more easily assembled than if pathway (24) were integral to spindle (14). However, for purposes of the method of the invention, it would not matter if pathway (24) were integral or separable. The opposed pairs of ball pathways (16-22) and (18-24) have an ideal pathway width D, which is the width they would have if ground absolutely to print. The pathway width D for the bearing balls is measured between the diagonally opposed, very thin annular sections (almost circles) along which the bearing balls would actually contact the pairs of pathways (16-22) and (18-24). Imaginary cones drawn through the pathway contact sections converge outside the bearing (10), each forming an ideal contact angle with the vertical, indicated at $\alpha$ and $\beta$ respectively.

Figure 2:
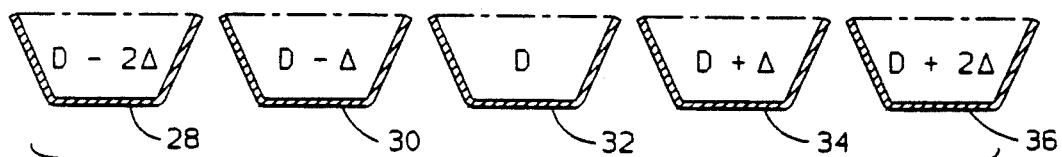
FIG. 2 is a schematic representation of a series of available ball classes.

Referring next to FIG. 2, an array of five bins of bearing balls is indicated schematically at (28) through (36). The bins (28) through (36) divide a supply of bearing balls into discrete classes, each of which, apart from the center class (32), would contain balls larger or smaller than the ideal diameter D. In general, each ball class differs from the ideal by an integer multiple of a discrete, small increment $\Delta$. One consideration that would determine how many ball classes would be needed would be the size of the range of possible pathway widths expected. That is, for any given $\Delta$, it might be necessary to go up to $D+3\Delta$ and down to $D-3\Delta$ to cover the expected range, which would require seven bins, not the five shown here. Another consideration is how finely it is desired to match the balls to the ball pathways. A finer match would be possible if the increment $\Delta$ were halved. Here, for example, $\Delta$ is one ten thousandth. If, instead, $\Delta$ were 5 hundred thousandths, then nine bins would be needed, at considerably more expense. The method of the invention avoids that extra cost.

Figures 3, 4:
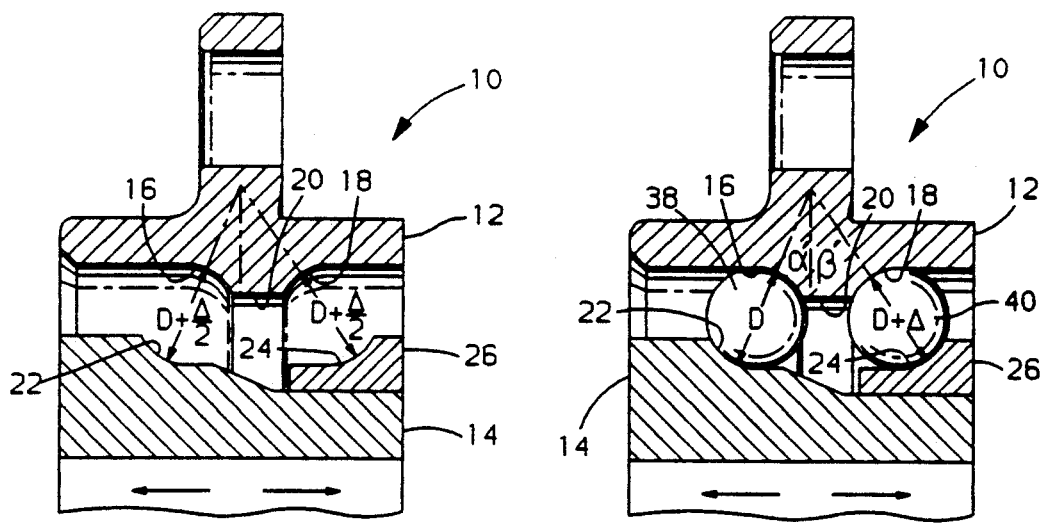
FIG. 3 is a cross section of the bearing of FIG. 1 showing the situation when the gauged ball pathway width does fall between two available classes.
FIG. 4 shows the bearing assembled according to the method of the invention.

Referring next to FIGS. 2 through 3, the assembly method of the invention is illustrated. First, the width of the two pairs of opposed pathways (16-18) and (22-24) is gauged in conventional fashion. The gauged width might fall close to one of the available ball classes (28) through (36), in which case, balls would simply be chosen for each row from that available class. However, the actual gauged width might fall almost dead between a pair of available ball classes. That is the situation shown in FIG. 3, where the gauged width is D plus one half of $\Delta$, midway between the available ball classes (32) and (34). In that case, according to the method of the invention, the balls for the row between one pair of pathways are chosen from the class below, (32), and those for the other row from the class above, (34), indicated at (38) and (40) respectively. Theoretically, this would have some effect on the ideal contact angles, which are shown as $\alpha'$ and $\beta'$ respectively. In practice, however, this effect has been found to be negligible. The improvement in end play has been found to be very significant, however. Measurements have shown the end play reduction with the different sized rows to be some 80% of the end play improvement that could have been theoretically achieved with a halved increment and more classes.

In conclusion, a significant end play reduction is achieved with the same number of ball classes. In automatic ball loading systems, different programming would be needed to define and recognize when the ball pathway width was considered to be "midway" between available classes, and to then choose the two classes above and below. The program would also have to provide for choosing same class balls when the pathway width did not fall near the midpoint value. However, the expense of these changes to a program would not be as great as would the provision of nearly twice as many ball classes.

The embodiments of the invention in which an exclusive property or privilege is claimed are defined as follows:

1. A method for choosing bearing balls with which to assemble a two row, angular contact bearing of the type having two axially spaced pairs of diagonally opposed pathways having an actual width that varies from bearing to bearing about an ideal ball diameter, comprising the steps of, providing a supply of bearing balls divided up into a number of discrete classes, each class having a diameter substantially equal to said ideal ball diameter plus or minus an integer multiple of a predetermined increment, gauging the actual width of said pathways for a bearing as measured between said diagonally opposed pathways, determining whether said actual width is substantially equal to a midpoint value halfway between two of said discrete ball classes, said two discrete classes defining a ball class above and a ball class below said midpoint value, and, if so, choosing bearing balls for one of said pathway pairs from the ball class below said midpoint value and for the other of said pathway pairs from the ball class above said midpoint value, thereby achieving an improved effective axial and play for said bearing when assembled.

* * * * *